Feb. 25, 1947. A. J. GRETSCHEL 2,416,621
DETACHABLE HANDLE FOR SUITCASES OR OTHER ARTICLES
Filed Nov. 14, 1945
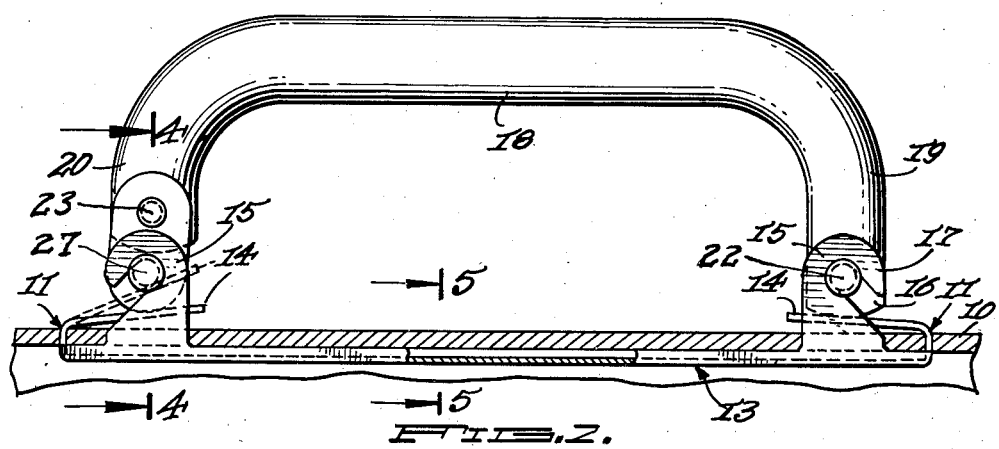
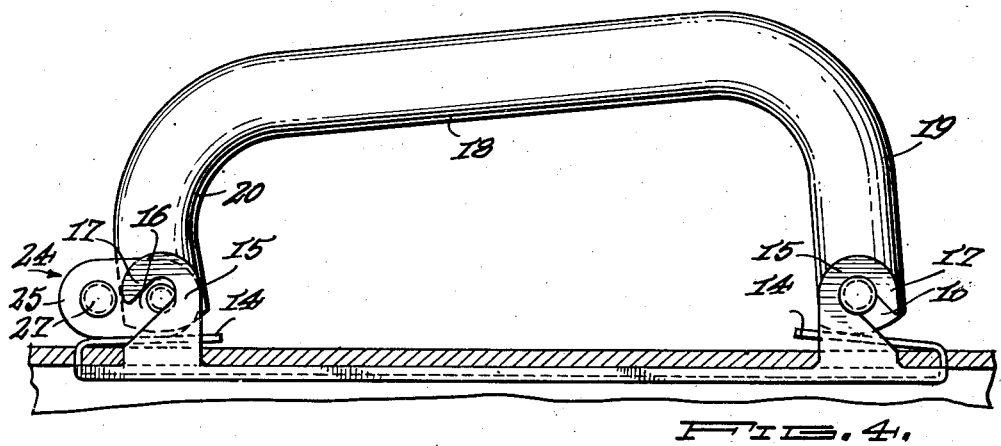
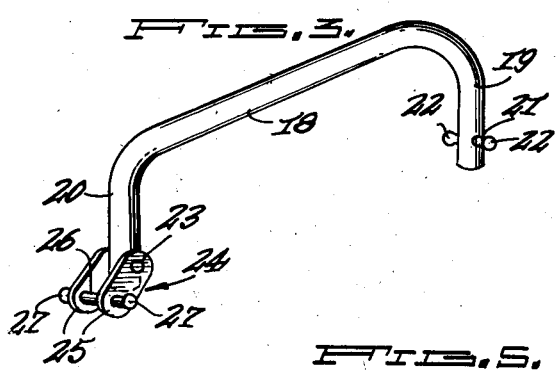
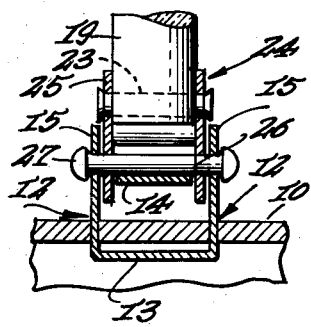
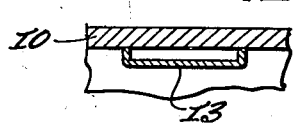
INVENTOR.
ADOLPH J. GRETSCHEL
BY
J. Ledermann
ATTORNEY.

Patented Feb. 25, 1947

2,416,621

UNITED STATES PATENT OFFICE 2,416,621

DETACHABLE HANDLE FOR SUITCASES OR OTHER ARTICLES

Adolph J. Gretschel, Long Island City, N. Y.

Application November 14, 1945, Serial No. 628,420

2 Claims. (Cl. 190—58)

1

This invention relates to handles for suitcases, handbags, trunks, and other articles, and one object is the provision of a novel, useful and practical detachable handle adapted to be detached from the article and placed in the pocket. One useful purpose to which the invention may be applied, relates to suitcases, and the detachability of the handle permits a person safely to set his suitcase on the floor of such a place, for instance, as the waiting room of a railroad station and then to walk away from the suitcase, without danger of having anybody steal it since the thief would be too readily noticeable if he carried the suitcase away under his arm or on his shoulder. Naturally, the detachable handle is subject to numerous other applications which need not be mentioned.

Another object of the invention is the provision of handle of the type mentioned, which is provided with means partly on the handle itself and partly secured to or on the article, whereby the handle may be readily and easily attached to or detached from the article.

A still further object of the invention is the provision of a detachable handle as above mentioned, which is simple in construction and operation and inexpensive in cost of manufacture.

The above and other objects will become apparent in the following description, wherein characters of reference refer to like-numbered parts in the accompanying drawing. It is to be noted that the drawing is intended for the purpose of illustration only, and that it is neither desired nor intended to limit the invention to any or all of the details of construction shown excepting insofar as they may be deemed essential to the invention.

Referring briefly to the drawings,

Fig. 1 is a side elevational view of the detachable handle applied to an article such as, for instance, a suitcase, a wall of the latter being shown in section and the handle support which is retained thereagainst and extends therethrough being shown with parts broken away and partly in section.

Fig. 2 is a view similar to Fig. 1 but showing the handle in an intermediate position which is assumed by it during the operation of attaching or detaching the same.

Fig. 3 is a perspective view of the detached handle per se.

Fig. 4 is a cross-sectional view taken on the line 4—4 of Fig. 1.

Fig. 5 is a cross-sectional view taken on the line 5—5 of Fig. 1.

2

Referring in detail to the drawing, the numeral 10 indicates the handle wall of any article such as, for instance, a suitcase, which is provided with spaced lateral slots 11 therethrough, and, adjacent each pair of end slots 11, a pair of longitudinal slots 12 therethrough. An elongated substantially flat rigid support 13 is provided at each end with a tongue 14 which, prior to securement of the support to the wall 10, extends upright therefrom. Adjacent each tongue 14, a pair of parallel ears 15 extend upright from the side edges of the support. The support 13 is secured to the wall 10 by passing the tongues 14 upward through the slots 11 and the ears 15 upward through the slots 12 and then bending both tongues inward substantially as shown in Fig. 1.

Each pair of ears 15 is provided with inclined and aligned slots 16 whose entrances or mouths are positioned on their outer edges intermediate their height, thereby providing on each pair of ears downwardly sloping noses 17 which convert the ears to hook-like members. At their upper extremities, the slots 16 are rounded.

The handle illustrated, which may be made of any substantially rigid material such as metal or a so-called plastic material such as, for instance, Lucite, or of wood or leather, or, also, of any non-rigid material, comprises the body or grip portion 18 having the depending arms 19 and 20. In the handle illustrated, the arm 19 is longer than the arm 20 and is provided near but spaced from its extremity with a transverse rigid pin 21 whose projecting extremities are provided with heads 22.

The shorter handle arm 20 is also provided with a transverse pivot pin 23. A carriage 24 which comprises a pair of spaced side walls 25 rigidly held together at one end by a pin 26 having its extremities extending beyond the walls and provided with heads 27, is pivotally secured to the pivot pin 23 at its other end so that the carriage 24 may swing about the pin 23 as a pivot.

To attach the handle to the suitcase, or, more specifically, to the ears 15, the handle is positioned over the support and the long arm 19 is lowered and maneuvered to insert the ends of the pin 21 in the slots 16, with the heads 22 of the pin 21 serving to prevent the pin ends from leaving the slots, and the arm 19 is then raised to register the pin 21 in the rounded extremities of the slots 16. Then the arm 20 is brought down into the position shown in Fig. 2. It is to be noted that both arms, in being brought down between their respective ears 15, depress the tongues 14 which, as is obvious, are resilient. The carriage 24 is then urged inward while the handle arm 20 is being raised, causing the pin ends of the pin 26 thereof to move up the slots 16 of the adjacent ears 15, and when the handle is then lifted to its extreme upward position, shown in Fig. 1, the ends of the pin 26 register in the rounded extremities of the slots 16. In the latter position the body 18 of the handle lies parallel with the wall 10.

To detach the handle, it is simply necessary to force the handle arm 20 downward, whence the carriage resumes its position shown in Fig. 2, whence the arm 20 may be raised clear of its ears 15 and, consequently, the arm 19 may be readily backed away from its ears 15. It is to be noted that the length of the pivot pin 23 is equal to or slightly less than the distance between the inner walls of the opposed ears 15.

The support 13 provides a rigid anchor of the handle to the wall 10 without danger of damaging the wall, and of course additional means, not shown, for securing it to the wall 10 could be provided.

Obviously, modifications in form and structure may be made without departing from the spirit and scope of the invention.

I claim:

1. In combination with an article having a wall, a support secured to said wall and having a pair of spaced upstanding ears at each end thereof, a handle having the extremities thereof of a thickness such that said extremities may be positioned between said ears of each of said pairs of ears, each of said pairs of ears having slots extending angularly and upwardly thereinto, one of said handle extremities having aligned lateral pin extensions thereon engageable in said slots of one of said pairs of ears, the other of said handle extremities having a carriage pivotally secured thereto at one end, the other end of said carriage having a pin therethrough parallel with the pivotal mounting of said one end of said carriage, said last-named pin having its extremities extending from the confines of said carriage and engageable in said slots of the other of said pairs of ears, and resilient means normally urging said handle extremities upward to maintain said pin extensions and said pin extremities in the upward extremities of their respective slots.

2. In combination with an article having a wall, a support secured to said wall and having a pair of spaced upstanding ears at each end thereof, a handle having the extremities of a thickness such that said extremities may be positioned between said ears of each of said pairs of ears, each of said pairs of ears having slots extending angularly and upwardly thereinto, one of said handle extremities having aligned lateral pin extensions thereon engageable in said slots of one of said pairs of ears, the other of said handle extremities having a carriage pivotally secured thereto at one end, the other end of said carriage having a pin therethrough parallel with the pivotal mounting of said one end of said carriage, said last-named pin having its extremities extending from the confines of said carriage and engageable in said slots of the other of said pairs of ears, said support having inwardly and upwardly extending resilient tongues on the ends thereof positioned between said ears of each of said pairs of ears and adapted normally to urge said pin extensions and said pin extremities upward in their said respective slots.

ADOLPH J. GRETSCHEL.

REFERENCES CITED

The following references are of record in the file of this patent:

UNITED STATES PATENTS

| Number | Name | Date |
|---|---|---|
| 988,896 | Quinn | Apr. 4, 1911 |
| 1,427,608 | Lotz | Aug. 29, 1922 |
| 1,471,385 | Critchley | Oct. 23, 1923 |
| 124,934 | Chapman | Mar. 26, 1872 |

FOREIGN PATENTS

| Number | Country | Date |
|---|---|---|
| 373,309 | German | Apr. 10, 1923 |
| 702,015 | German | Jan. 29, 1941 |